UNITED STATES PATENT OFFICE.

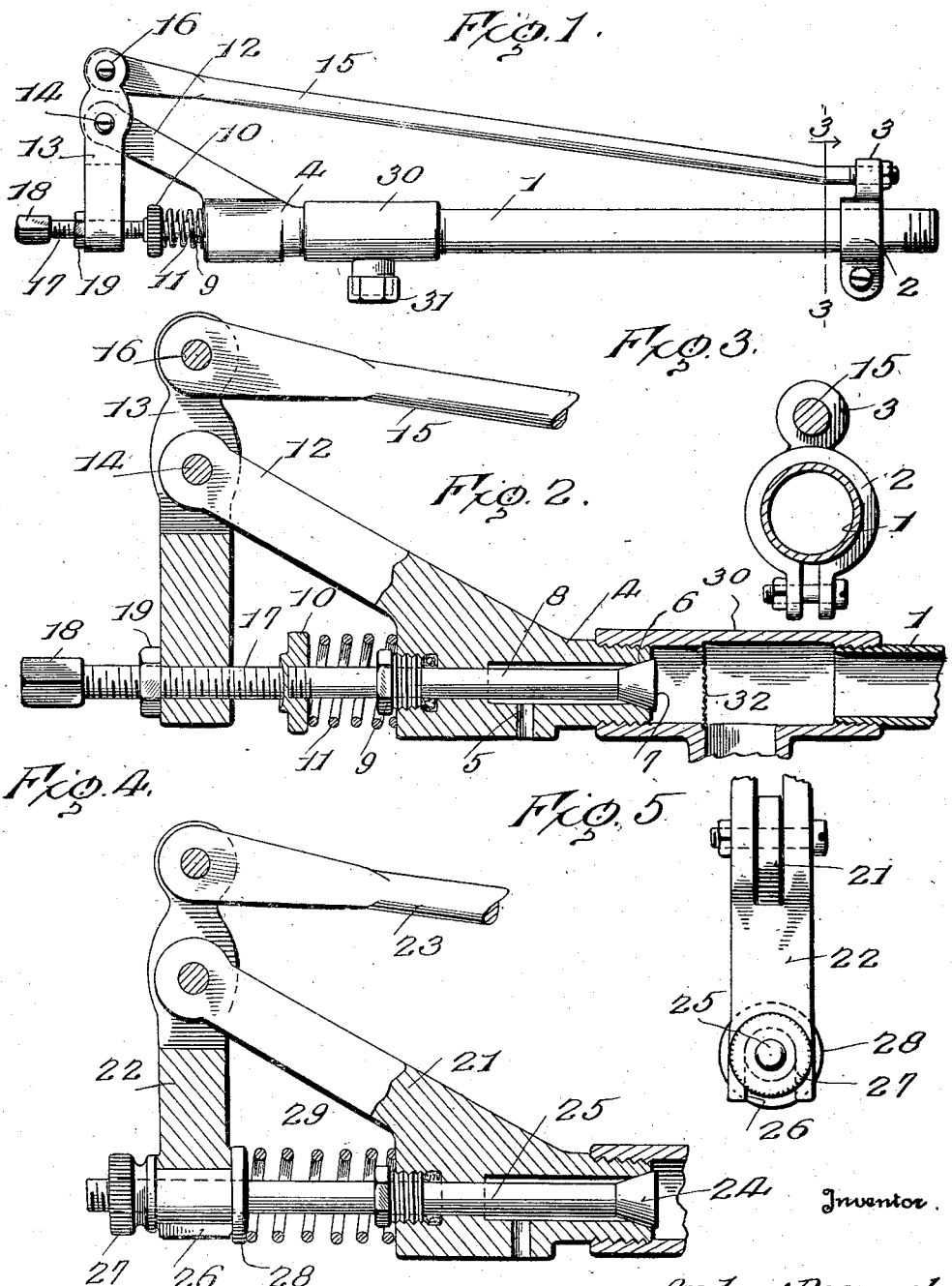

ANDREW POSPESEL, OF OSWEGO, NEW YORK.

RELIEF-VALVE.

1,274,775.   Specification of Letters Patent.   Patented Aug. 6, 1918.

Application filed January 16, 1918. Serial No. 212,017.

*To all whom it may concern:*

Be it known that I, ANDREW POSPESEL, citizen of the United States, residing at Oswego, in the county of Oswego and State of New York, have invented certain new and useful Improvements in Relief-Valves, of which the following is a specification.

This invention relates to relief valves for draining the water of condensation from steam pipes and has special reference to relief valves of the type disclosed in Letters Patent No. 1,192,113, granted to me July 25, 1916.

The invention is illustrated in the accompanying drawings and will be hereafter fully described, the novel features being particularly pointed out in the appended claim.

In the drawings—

Figure 1 is an elevation of a relief valve embodying my present improvements;

Fig. 2 is an enlarged longitudinal section;

Fig. 3 is a transverse section on the line 3—3 of Fig. 1;

Fig. 4 is an enlarged longitudinal section showing a slight modification;

Fig. 5 is an end view of the structure shown in Fig. 4.

In the drawings, the reference numeral 1 designates a pipe or tube of thermostatic material which is engaged at one end in a steam supply pipe so as to communicate therewith. Around the thermostatic tube or pipe, at the inner end thereof, is secured a clamp collar 2 having a perforated lug or post 3 on one side. At the opposite or outer end of the thermostatic tube or pipe is mounted a head 4, a vent or drain passage 5 being formed in the said head and communicating with the interior of the thermostatic tube or pipe so as to form an outlet for the water of condensation which tends to collect therein. The inner end of the vent passage 5 is beveled, as shown at 6, to form a seat for a valve 7 which has its stem 8 extending through the outer end of the head 4 and through a packing box 9 secured in said head. In the form of the device shown in Figs. 1 and 2, the valve stem 8 has a collar or disk 10 secured to its outer end and a spring 11 is coiled around the stem between the said collar and the head 4 so as to hold the valve normally seated and thereby prevent the escape of steam from the thermostatic tube. A supporting arm 12 is projected from one side of the head 4 and is preferably formed integral therewith, the said arm extending obliquely so as to project beyond the end of the head as well as laterally therefrom and to the outer extremity of the said arm is pivotally secured a lever 13 which is bifurcated, as shown most clearly in Fig. 2, so as to straddle the end of the arm 12 and thereby reduce the strain upon the pivot pin 14. Within the extremity of the bifurcated portion of the lever is pivotally attached the outer end of a brace 15 which has its inner end inserted through and secured in the perforated lug 3 upon the clamp collar 2, this brace 15 being solid and constructed of some material which is not readily affected by changes in temperature so that it will remain approximately constant in length. The distance between the pin 14 and the pin 16, securing the brace rod 15 to the lever, constitutes the short arm of the lever, while the longer arm of the lever extends across the axial plane of the valve stem 8. In the free end of the lever is mounted an adjusting screw 17 which has its inner end bearing upon the outer end of the valve stem, or upon the collar 10 secured thereto, and its outer end is formed or provided with a head 18 by which it may be readily rotated so as to properly adjust the valve. A lock nut 19 is mounted upon the screw 17 and bears against the outer side of the lever 13 so as to hold the parts in the set adjustment.

The head 4 may be fitted directly upon the end of the thermostatic tube but I prefer to connect the tube and head by a T-coupling or trap 30 equipped with a cap 31 and provided internally with a screen 32 whereby the flow of scale or rust to the vent valve 7 will be prevented. Obviously, removal of the cap 31 will permit withdrawal of the accumulated scale or other deposit.

The operation of the valve will be readily understood. In the normal condition of the apparatus, the valve is seated and flow through the vent passage 5 is prevented, but if the steam pressure should fall so that the temperature of the steam pipe and the thermostatic tube should be reduced, the said tube will contract and the head 4 will obviously follow the axial movement of the tube. This movement of the head will cause a relative shifting of the pins 14 and 16 inasmuch as the brace 15 is relatively stationary or fixed. Consequently, the free end of the lever 13 will swing inwardly more rapidly than the outer end of the same moves inwardly and this accelerated movement of the free end of the lever will be transmitted through the screw 17 directly to the valve stem 8 so that the valve will be moved from its seat and the water of condensation permitted to escape. Of course, as the supply of steam is replenished and the temperature again raised, the parts will move in the reverse direction and the valve will be automatically seated. It will thus be seen that I have provided an exceedingly simple, compact, strong, and durable device which will automatically permit draining of a steam pipe and automatically cut-off the escape of steam under normal conditions.

In the arrangement shown in Figs. 4 and 5, the thermostatic tube, the head 21, lever 22, and brace 23 are the same as the corresponding parts in the previously described arrangement. The valve 24 is the same as the valve 7 but has its stem 25 extended through an open ended slot 26 in the free end of the lever and an adjusting nut or sleeve 27 is mounted upon the outer threaded extremity of the stem to bear against the outer side of the lever, and extend through the slot 26, as clearly shown. A collar 28 on the stem bears against the inner side of the lever, and a spring 27 is coiled around the stem between the said collar and the outer end of the head so as to hold the valve normally seated.

Having thus described the invention, what is claimed as new is:

A device for the purpose set forth comprising a thermostatic tube to communicate with a steam supply pipe, a head fitted to and closing the outer end of said thermostatic tube and having an arm projecting obliquely therefrom and beyond the outer end thereof, said head being provided interiorly with a vent passage communicating with the interior of the thermostatic tube, a valve seating upon the inner end of the head to close said vent passage and having its stem extending through the outer end of the head, a collar upon the stem beyond the head, a spring coiled around the stem between the said collar and the end of the head to hold the valve normally seated, a lever pivoted intermediate its ends upon the outer end of the obliquely disposed arm, a brace disposed at one side of the tube and head and having its inner end secured to a fixed support and its outer end pivoted to one end of the lever, an adjusting member mounted in and passing through the free end of the lever operatively engaged with the outer end of the valve stem and a locking member bearing against the lever to hold the adjusting member in a set position relative to the lever.

In testimony whereof I affix my signature.

ANDREW POSPESEL. [L. S.]

Copies of this patent may be obtained for five cents each, by addressing the "Commissioner of Patents, Washington, D. C."